United States Patent
Hackl et al.

(10) Patent No.: US 6,226,579 B1
(45) Date of Patent: May 1, 2001

(54) METHOD AND APPARATUS FOR OPERATING A STEERING SYSTEM FOR A MOTOR VEHICLE

(75) Inventors: Matthias Hackl; Wolfgang Kraemer, both of Stuttgart (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/045,613

(22) Filed: Mar. 20, 1998

(30) Foreign Application Priority Data

Mar. 22, 1997 (DE) .............................. 197 12 164
Nov. 19, 1997 (DE) .............................. 197 51 125

(51) Int. Cl.$^7$ ...................................... B62D 6/00
(52) U.S. Cl. ............................ 701/41; 180/422
(58) Field of Search ..................... 701/41; 180/408, 180/412, 422

(56) References Cited

U.S. PATENT DOCUMENTS

| | | | |
|---|---|---|---|
| 3,831,701 | 8/1974 | Pilon et al. | 180/79.2 R |
| 4,998,593 | * 3/1991 | Karnopp et al. | 180/408 |
| 5,035,295 | 7/1991 | Leiber et al. | 180/140 |
| 5,089,967 | 2/1992 | Haseda et al. | 364/426.02 |
| 5,205,371 | 4/1993 | Karnopp | 180/79.1 |
| 5,227,974 | 7/1993 | Tomoda et al. | 364/424.05 |
| 5,229,955 | 7/1993 | Nishiwaki et al. | 364/550 |
| 5,316,379 | 5/1994 | Becker et al. | 303/100 |
| 5,428,532 | 6/1995 | Yasuno | 364/424.05 |
| 5,528,497 | * 6/1996 | Yamamoto et al. | 701/41 |
| 5,732,371 | 3/1998 | Fujita | 701/38 |
| 5,732,379 | 3/1998 | Eckert et al. | 701/83 |
| 5,742,919 | 4/1998 | Ashrafi et al. | 701/70 |
| 5,774,819 | * 6/1998 | Yamamoto et al. | 701/41 |
| 5,790,966 | 8/1998 | Madau et al. | 701/41 |
| 5,832,402 | 11/1998 | Brachert et al. | 701/72 |
| 5,845,222 | * 12/1998 | Yamamoto et al. | 701/41 |
| 5,853,064 | 12/1998 | Hackl et al. | 180/422 |

FOREIGN PATENT DOCUMENTS 3 625 392    8/1987 (DE) .

* cited by examiner

Primary Examiner—Michael J. Zanelli
Assistant Examiner—Eric M Gibson
(74) Attorney, Agent, or Firm—Baker & Daniels

(57) ABSTRACT

A steering system for a motor vehicle with at least one steerable wheel, an actuator, and an auxiliary drive. The steering motion initiated by the driver of the vehicle and the motion initiated by the actuator are superimposed by the auxiliary drive to generate the steering motion of the steerable wheel. At least two steering components are computed and a control signal is generated to control the actuator by superimposing the computed steering components. The steering components are computed in parallel and independently of one another so that several functions are beneficially combined to control running behavior. This provides an improvement of running dynamics by means of steering interventions.

11 Claims, 6 Drawing Sheets

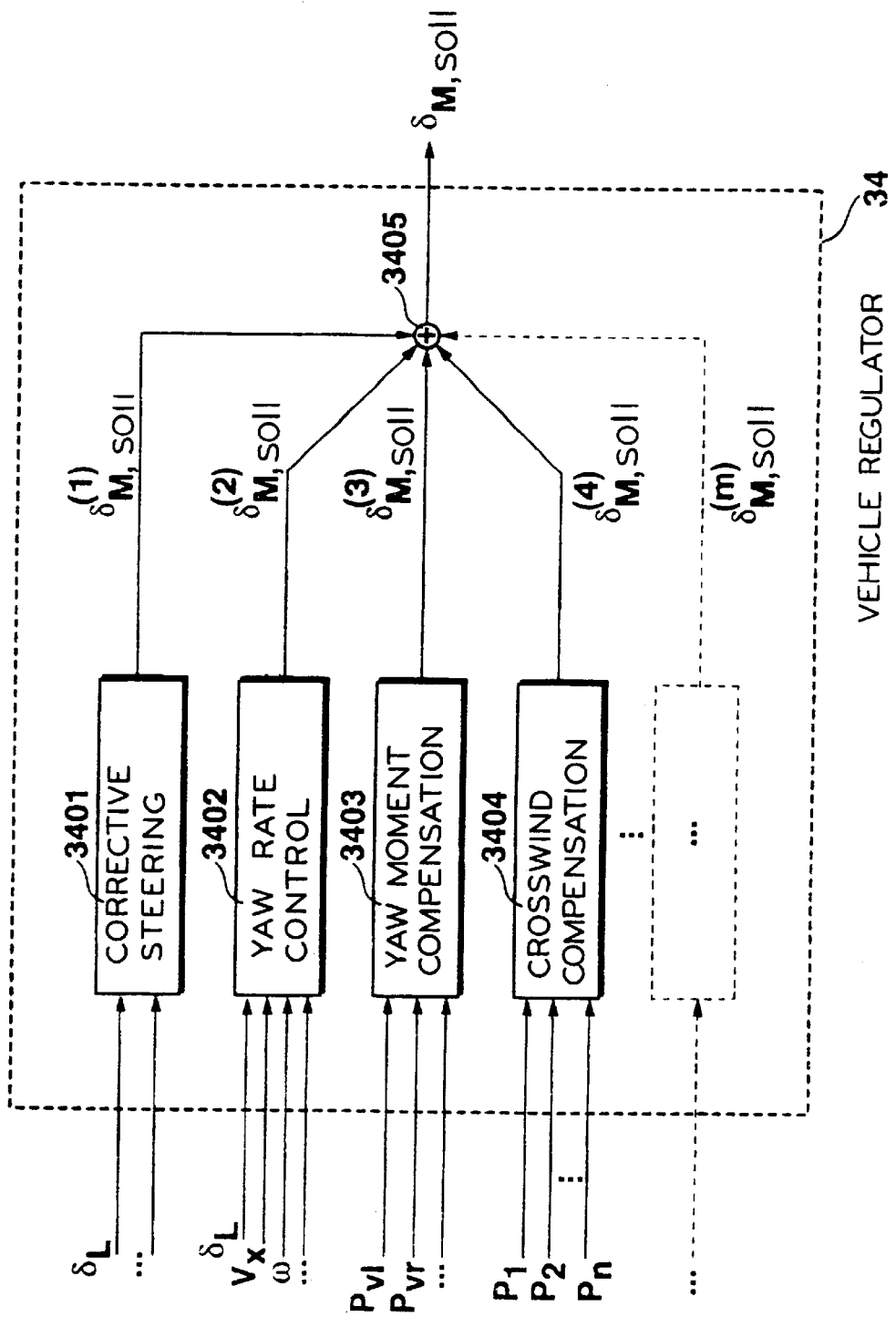

METHOD AND APPARATUS FOR OPERATING A STEERING SYSTEM FOR A MOTOR VEHICLE

BACKGROUND OF THE INVENTION

This invention relates to a method and an apparatus for operating a steering system for a motor vehicle.

A prior art steering system is disclosed by DE-OS 40 31 316 (corresponding to U.S. Pat. No. 5,205,371) and to the extent it is relevant to understanding this invention, will be described with reference to FIGS. 1 and 2. In such a steering system the motions of the actuator 13 or 23, the motor angle $\delta_M$, are superimposed in the auxiliary drive 12 or 22 on the steering motions imparted by the driver through the steering wheel 11 or 21, the steering wheel angle $\delta_L$ detected by the sensor 28. The total motion $\delta_L{}'$ thus obtained is transmitted through the steering mechanism 14 and the steering linkage 16 to the steerable wheels 15a and 15b to set the steering angle $\delta_V$. The actuator 13 or 23 can be an electric motor. The operating principle of such a steering system consists of determining the motor angle $\delta_M$ dependent on the steering wheel angle $\delta_L$ and dependent on signals Sm to control the dynamic behavior of the vehicle, with the steering wheel angle $\delta_L$ being determined through the sensor 28 and with the signals Sm representing vehicle motions detected by the sensors 26. The total steering angle is obtained according to the equation $$\delta_L{}' = \delta_L/i_{\ddot{u}} + \delta_M,$$

in which the transmission ratio can be $i_{\ddot{u}} = 1$ or $i_{\ddot{u}} \approx 1$.

DE-OS 40 38 079 (corresponding to U.S. Pat. No 5,316,379) shows the superimposition of a steering component (compensating steering angle) on the front wheel and/or the rear wheel. The compensating steering angle, which depends on the differences between brake pressures, compensates for the yawing motion in the case of so-called ì-split braking, i.e. braking in which the coefficients of roadway friction are significantly different on the right and left sides of the vehicle.

DE 196 01 825.0, not a prior art publication, shows a steering system that is similar to DE-OS 40 31 316 described above (corresponding to U.S. Pat. No. 5,205,371). In this case two steering components are superimposed to obtain a desired output rotational motion for the servomotor, with a first steering component serving for steering assistance, while a second steering component depends on the angular yaw rate, transverse acceleration, and/or the vehicle's longitudinal speed.

DE A1 36 25 392 shows the generation of a correction signal to a servomotor that controls the front wheel steering angle. The correction signal in this case depends on a desired-actual yaw rate difference.

GB-PS 1,414,206 shows compensation of crosswind effects by a superimposed steering angle intervention.

The purpose of this invention is to combine various control and regulation functions relating to a steering system in a suitable fashion.

SUMMARY OF THE INVENTION

As already mentioned hereinabove, this invention relates to a steering system for a motor vehicle with at least one steerable wheel, an actuator, and an auxiliary drive. The steering motion initiated by the driver of the vehicle and the motion initiated by the actuator are superimposed by the auxiliary drive to generate the steering motion of the steerable wheel. At least two steering components are computed and a control signal is generated by superimposing the computed steering components to control the actuator. The core of the invention consists of computing the steering components in parallel and independently of one another.

The invention makes it possible to combine several functions beneficially to control road behavior. This provides an improvement of running dynamics by means of steering interventions.

The individual steering components are advantageously computed by providing that each of the steering components is computed to achieve a predetermined control or regulation objective. It is provided in particular that the control or regulation objectives for the individual steering components are stated differently. The steering components in this case can be computed at the same time, or in each sensing step when accomplished in a digital processor.

Thus, different individual functions of steering intervention are combined with one another.

The combination of individual steering components pursuant to the invention produces all of the advantages that the steering system permits, and thus exhausts the entire possible potential of steering interventions. The different individual functions supplement and assist one another mutually. Furthermore, the invention guarantees ease of application since the individual functions affect only some running dynamics characteristics of the vehicle and can be individually fine-tuned. For this reason there are few objective conflicts in application since the different functions provide adequate degrees of freedom for the selective control of individual characteristics and to produce definite benefits. The individual functions can be combined freely as needed or desired.

An especially beneficial refinement of the invention provides that the steering components are computed by

- regulating the yawing motion of the motor vehicle, particularly the angular yaw rate, to a definite desired value (yaw rate control), and/or
- counteracting a yawing motion caused by a motor vehicle braking process (yaw moment compensation), and/or
- counteracting crosswind effects (crosswind compensation), and/or
- a steering component dependent on the speed of rotation of the steering wheel) (corrective steering).

It can be provided in particular that

- in the case of yaw rate control, the instantaneous angular yaw rate is detected, the desired value is determined at least dependent on the detected rotation of the steering wheel and the detected vehicle speed, and a steering component is computed dependent on the difference between the instantaneous angular yaw rate and the desired value, and/or
- in the case of yaw moment compensation, a steering component is computed that is dependent on the detected brake pressures applied to the vehicle's brakes on different sides of the vehicle, and/or
- in the case of crosswind compensation, a steering component is computed dependent on air pressures detected at various positions on the vehicle body.

It can also be provided pursuant to the invention that the computed steering components be coordinated differently, in particular weighted, dependent on the instantaneous running conditions. The underlying idea for this refinement is to control some or all of the prevailing individual steering functions through a priority coordinator.

BRIEF DESCRIPTION OF THE DRAWINGS

FIG. 5 shows a yaw moment compensator, while FIG. 6 depicts the entire vehicle control with reference to a block diagram.

DESCRIPTION OF THE PREFERRED EMBODIMENT

The invention will be discussed below with reference to an example of a preferred embodiment. The starting point by way of example is an auxiliary steering system as mentioned hereinabove.

Figure 1:
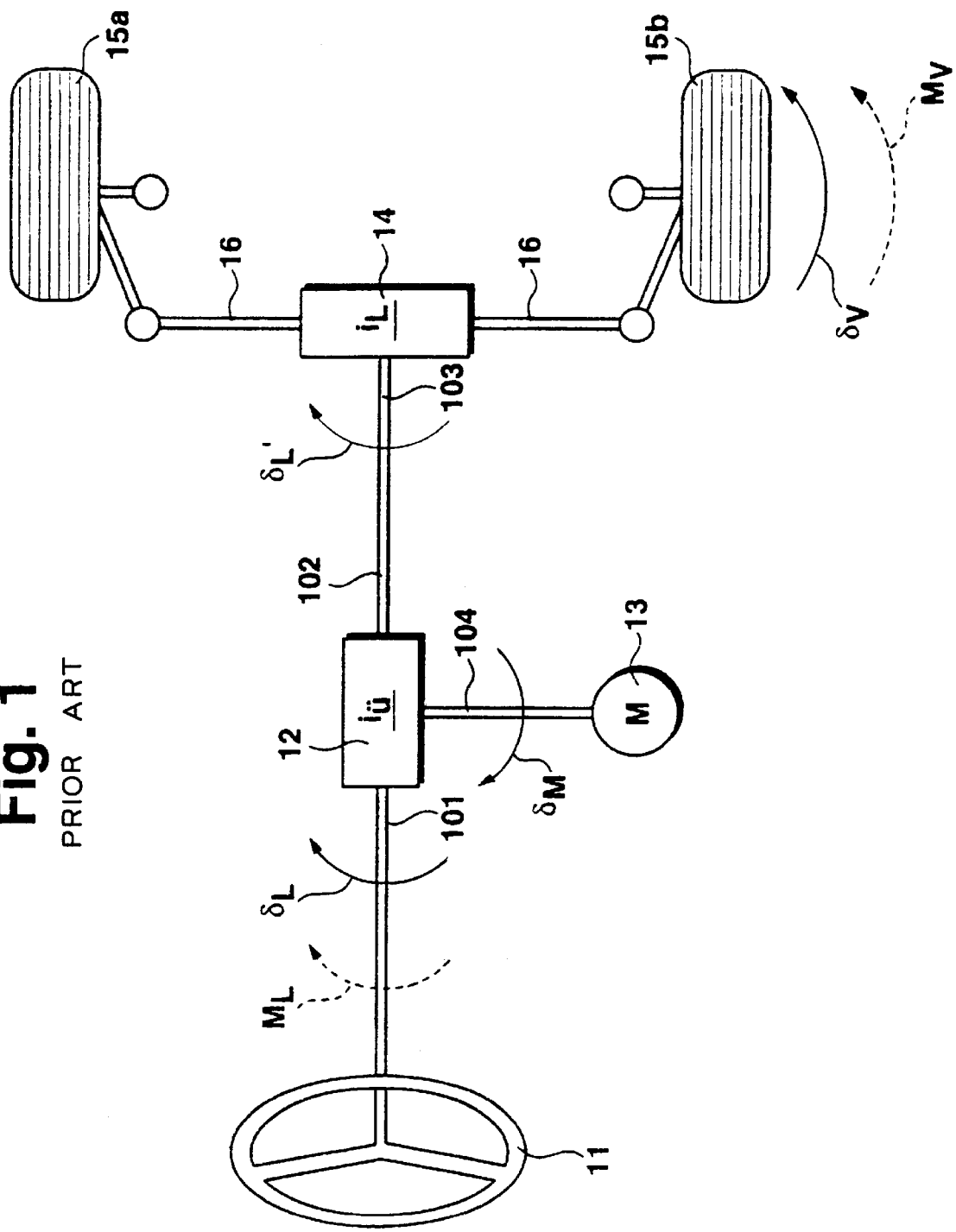
FIGS. 1 and 2 show schematically the steering system pursuant to the prior art.
Figure 2:
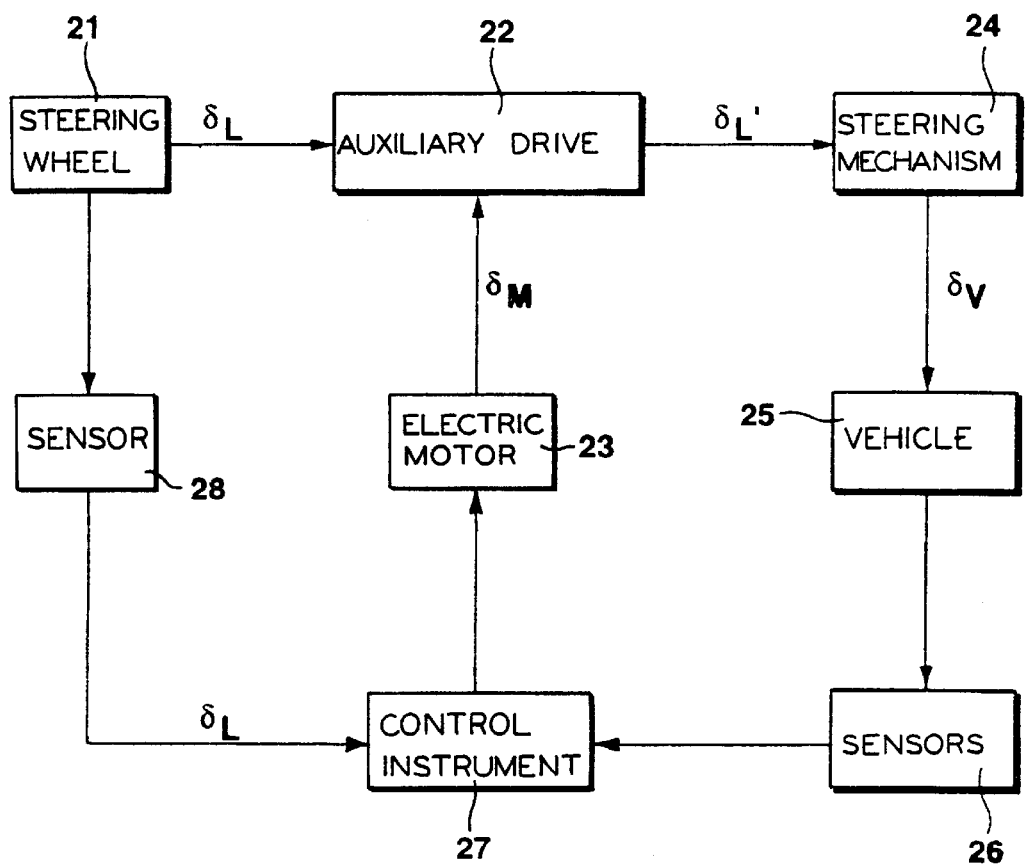

FIGS. 1 and 2 with the reference symbols 11 and 21, respectively, show a steering wheel operable by the driver of the vehicle. By operating the steering wheel 11 or 21, the steering wheel angle $\delta_L$ is transmitted to the auxiliary drive 12 or 22 through the connection 101. At the same time, the motor angle $\delta_M$ of the actuator 13 or 23 is transmitted to the auxiliary drive 12 or 22 through the connection 104; the actuator can be an electric motor. At the output of the auxiliary drive 12 or 22, the superimposed motion $\delta_L'$ is transmitted through the connection 103 to the steering mechanism 14 or 24, which in turn impacts the steerable wheels 15a and 15b with the steering angle $\delta_V$ corresponding to the total angle $\delta_L'$ through the steering linkage 16. Sensors 28 and 26 are also shown in FIG. 2, with the sensor 28 detecting the steering wheel angle $\delta_L$ and transmitting it to the control instrument 27, while sensors labeled 26 sense the motions of the vehicle 26 (e.g. yawing motions, transverse acceleration, vehicle speed, etc.) and transmit corresponding signals Sm to the control instrument 27. The control instrument 27, dependent on the detected steering wheel angle $\delta_L$ and, as the case may be, dependent on the vehicle motions, determines a correcting variable u to control the actuator 13 or 23.

Figure 3:
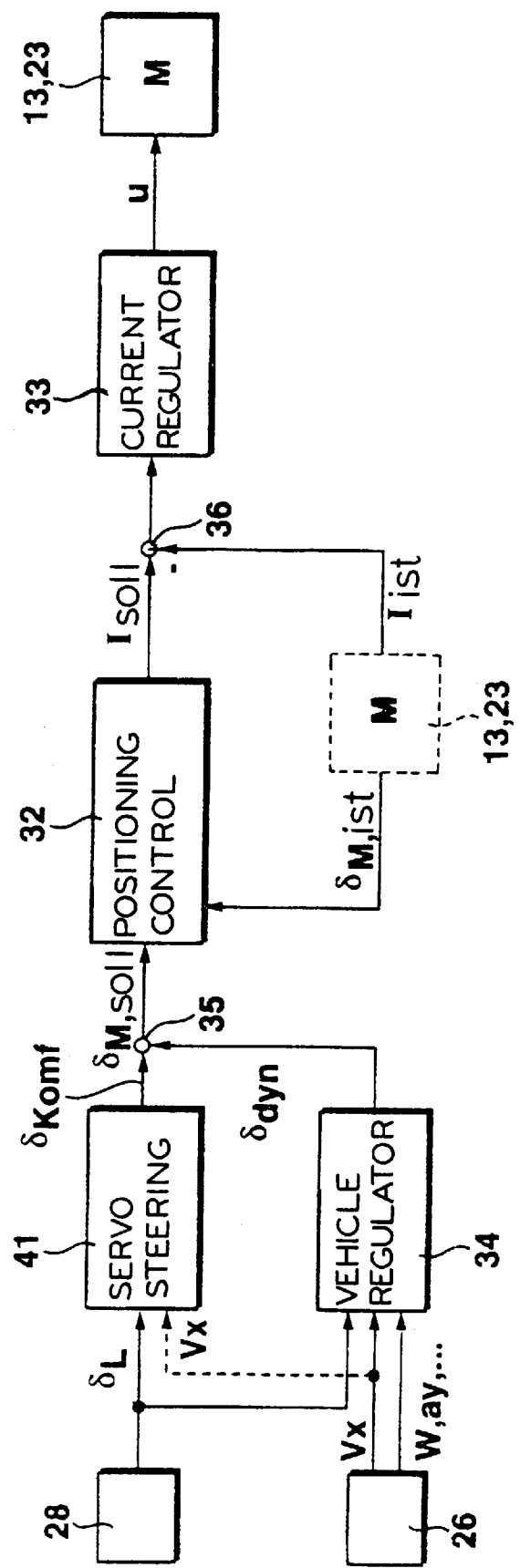
FIG. 3 represents the control and regulation strategy of such a steering system.

FIG. 3, with reference to a block diagram, shows how the steering system functions when the vehicle is running. The steering wheel angle $\delta_L$ detected by the sensor 28 is transmitted to the servo steering control 41 for this purpose. The servo steering control 41, dependent on the steering wheel angle $\delta_L$ and, as the case may be, dependent on the vehicle's longitudinal speed $V_x$, determines a steering component $\delta_{Komf}$. The vehicle regulator 34, dependent on the vehicle motions detected by the sensors 26 (the vehicle's longitudinal speed $V_x$, yaw rate $\dot{u}$, transverse acceleration, etc.), also determines another, dynamic steering component $\delta_{dyn}$. The steering component $\delta_{Komf}$ that takes into consideration the servo steering function, and the steering component $\delta_{dyn}$, by which the running dynamics of the vehicle are optimized, are superimposed at Point 35 to give a desired motor angle $\delta_{M,soll}$ that is transmitted to the input side of the positioning control 32. The instantaneous motor angle $\delta_{M,ist}$ of actuator 13 or 23 (e.g., an electric motor is also transmitted to the positioning control 32. Based on a desired-actual comparison, the underlying positioning control 32 determines the desired motor current $I_{soll}$ in a known way. The current regulator 33, based on the difference between the desired motor current $I_{soll}$ and the actual current $I_{ist}$ detected on the vehicle actuator 13 or 23 (subtraction 36), determines a corresponding control signal u for the actuator 13 or 23 to bring about the desired motor angle $\delta_{M,soll}$.

Before the superimposition of the individual steering components $\delta^{(i)}_{M,soll}$ is described with reference to FIG. 6, some individual running dynamics functions will first be discussed below in connection with steering interventions.

Corrective Steering

The steering intervention known as corrective steering is a control in which the added angle $\delta^{(1)}_{M,soll}$ is proportional to the speed of rotation of the steering wheel $d(\delta_L)/dt$, i.e. the differential of the steering wheel angle $\delta_L$. Corrective steering improves the response behavior of the vehicle to the driver's operation of the steering wheel.

Yaw Rate Control

Figure 4:
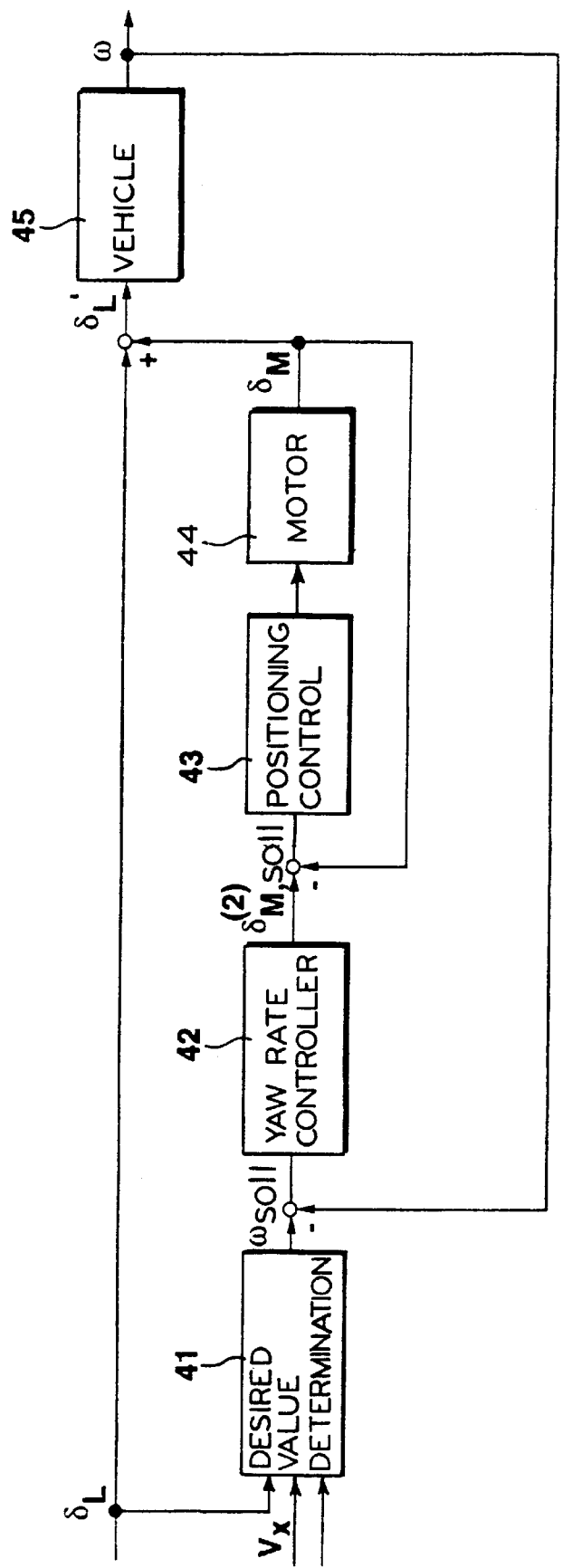
FIG. 4 shows a yaw rate controller.

FIG. 4 shows a yaw rate controller. Yaw rate means the rotational motion of a vehicle around a vertical axis. A desired yaw rate $\dot{u}_{soll}$ is calculated here from the vehicle speed $V_x$, the steering wheel angle $\delta_L$, and any other variables in Block 41. If the vehicle's yaw rate $\dot{u}$ measured on the vehicle 45 differs from this, the yaw rate controller 42 determines a desired added angle $\delta^{(2)}_{M,soll}$ so that the yaw rate deviation is reduced. By comparison with the instantaneous motor angle $\delta_M$ that is set, the motor 44 is impacted through the underlying positioning controller 43 so that the appropriate added angle $\delta_M$ is set and is superimposed on the steering motion $\delta_L$ of the driver. The yaw rate controller increases the damping of the yawing motion, improves running stability, and reduces the influence of vehicle parameters.

Yaw Moment Compensation

Figure 5:
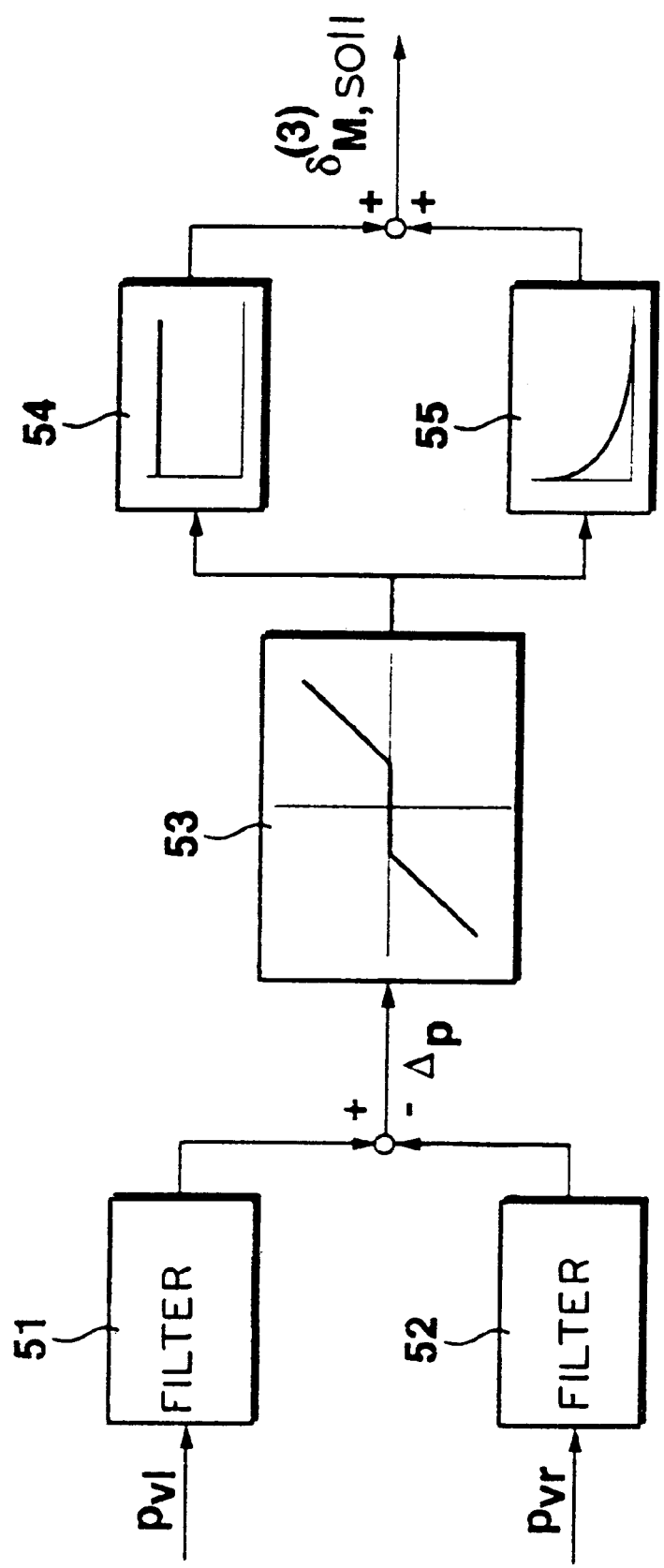

When a severe braking process, particularly antilock braking (ABS braking), takes place on a roadway that shows very different coefficients of friction on the right and left sides of the vehicle, a yaw moment arises in a known way. In the case of the yaw moment compensator shown in FIG. 5, automatic countersteering occurs during ABS braking on such an asymmetric roadway, by which undesirable yawing (rotation of the vehicle around its vertical axis) is prevented.

For yaw moment compensation, the brake pressures $p_{vl}$ and $p_{vr}$ on the left and right front wheels are first either sensed directly or calculated from available measured data (e.g., valve opening times, bias pressure). These wheel brake pressures are then filtered in the filters 51 and 52 to cancel out interference effects. The difference between the brake pressures filtered in this way is then processed in Block 53 (proportional amplifier with dead band). The magnitude of the steering intervention $\delta^{(3)}_{M,soll}$ is then determined from the difference thus processed by means of a constant amplification factor and a time-variable amplification factor (Blocks 54 and 55). In case of ABS individual control at the rear axle, the brake pressures at the rear wheels can also be taken into consideration.

Compensation for Crosswind Effects

A compensator for crosswind effects is known, for example according to Tran, V. T.: Crosswind Feedforward Control—A Measure to Improve Vehicle Crosswind Behavior, Vehicle Systems Dynamics 23 (1993), pp. 165–205. The added angle $\delta^{(4)}_{M,soll}$ in this case is calculated from air pressures $p_i$, i=1, . . . , n, at various points on the body. This function automatically countersteers in case of crosswind and thus prevents unwanted yawing of the vehicle.

Each of the individual functions described above produces only some of the desired benefits. To obtain all of the benefits, pursuant to the invention the functions are combined as shown in FIG. 6.

The individual functions 3401 to 3404 are executed in parallel at the same time. When implemented in a digital processor, the algorithns of the individual functions 3401 to 3404 are processed in each sensing step. Each individual function 3401 to 3404 provides a contribution $\delta^{(i)}_{M,soll}$ to the desired value $\delta_{M,soll}$ of the added steering angle. These contributions are superimposed at Point 3405.

FIG. 6 shows an example of a block diagram of a vehicle regulator 34 that consists of a combination of the individual functions 3401 to 3404 described above. The contributions of the individual functions to the added angle are labeled $\delta^{(i)}_{M,soll}$, i=1, . . . , m. Which individual functions the vehicle regulator 34 includes can be established according to the particular requirements or desires. In this sense the vehicle regulator does not have to include all of the individual functions mentioned, but others can also be added.

It is also possible for some or all of the individual functions that are present to be controlled by a priority coordinator. In this case, it can be provided that it is not a simple superimposition of the individual steering components $\delta^{(i)}_{M,soll}$ that takes place at Point 3405, but that the steering components $\delta^{(i)}_{M,soll}$ are coordinated, or especially weighted, individually depending on the instantaneous running state.

In summary, the following benefits of the invention can be pointed out:

Combination of several functions to control vehicle behavior and improve running dynamics by steering intervention at the front axle.

Simple superimposition of the steering interventions of the individual functions, i.e. addition of the corresponding desired values of the added steering angles.

Provision of all of the benefits that the steering system permits; full utilization of potential.

Individual functions supplement and assist one another mutually.

Simple applicability, since the individual functions control only some running dynamics characteristics of the vehicle and can be fine-tuned individually.

Few objective conflicts in application, since the different functions offer adequate degrees of freedom for selective control of individual characteristics and for provision of definite benefits.

Individual functions can be combined freely as needed or desired.

Additional coordination of some or all of the individual functions is possible.

What is claimed is:

1. Method for operating a steering system for a motor vehicle which has one steerable wheel (15), an actuator (13; 23), and an auxiliary drive (12; 22), the method comprising: superimposing a steering angle initiated by a driver of the vehicle and an angle initiated by said actuator (13; 23) to generate a steering motion of the steerable wheel by:

computing at least two steering components in parallel and independently of one another;

coordinating the computed steering components as a function of an instantaneous prevailing running state;

generating a control signal by superimposing the coordinated steering components, and controlling the actuator by means of the generated control signal to initiate the motion.

2. Method according to claim 1, wherein the steering components are computed by computing each of the steering components to achieve one of a predetermined control and a regulation objective.

3. Method according to claim 2, wherein the control and regulation objectives are set differently for each individual steering component.

4. Method according to claim 1, wherein the steering components are computed at the same time.

5. Method according to claim 1, wherein the steering components are computed in such a way that at least two of the following conditions are met:

the angular yaw rate of the motor vehicle is regulated to a definite desired yaw rate control value, and a yawing motion caused by a braking process of the motor vehicle is counteracted by a yaw moment compensation, and crosswind effects are counteracted by crosswind compensation, and a corrective steering component that depends on the speed of rotation of the steering wheel (11).

6. Method according to claim 5, wherein:

in the case of yaw rate control, the instantaneous angular yaw rate is detected, the desired value is determined as a function of the detected rotation of the steering wheel and the detected vehicle speed, and a steering component is computed as a function of the difference between the instantaneous angular yaw rate and the desired value, and in the case of yaw moment compensation, computing a steering component as a function of detected brake pressures that are being applied to the vehicle's brakes on different sides of the vehicle, and in the case of crosswind compensation, computing a steering component as a function of air pressures detected at various points on the body of the vehicle.

7. Method according to claim 1, wherein the computed steering components are differently weighted as a function of the instantaneous prevailing running state.

8. Method according to claim 1, wherein the steering components are computed in a digital processor.

9. Apparatus for operating a steering system for a motor vehicle comprising: a steerable wheel (15), an actuator (13; 23), and an auxiliary drive (12; 22), wherein a steering angle initiated by a driver of the vehicle and an angle initiated by the actuator are superimposed by the auxiliary drive to generate the steering motion of the steerable wheel;

means for computing two steering components arranged in parallel and independently of one another;

means for coordinating the computed steering components as a function of an instantaneous prevailing running state:

means for generating a control signal by superimposing the coordinated steering components; and controlling the actuator (13; 23) by means of the generated control signal to initiate the motion.

10. Apparatus according to claim 9, wherein the steering components are computed in said means for computing (34; 3401–3404) by computing each of the steering components to achieve one of a predetermined control and a regulation objective.

11. Apparatus according to claim 10, wherein one of the control and regulation objectives are set differently for the individual steering components.

* * * * *